May 22, 1951  W. H. JENSEN ET AL  2,553,972
ELECTROMECHANICAL TIME COUNTER
Filed July 1, 1948

INVENTORS
WILLIAM H. JENSEN
MAURICE R. BATES
BY
ATTORNEYS

Patented May 22, 1951

2,553,972

UNITED STATES PATENT OFFICE 2,553,972

ELECTROMECHANICAL TIME COUNTER

William H. Jensen and Maurice R. Bates, Milwaukee, Wis.

Application July 1, 1948, Serial No. 36,324

1 Claim. (Cl. 161—15)

This invention appertains to the use of portable machines, such as electric welders and the like, and more particularly to novel means for determining the exact length of time of the actual use of any machine embodying a governor controlled power plant.

It is customary in the trade to rent out electric welding machines, air compressors, hammer mills, etc. which are governor controlled, by the day, week, etc. In this form of rental, there is no way of telling the exact number of production hours the rented machine is used.

One of the primary objects of our invention is to provide a novel attachment for rental machines embodying an electric motor for driving a unit counter at a certain rate per hour, with means for automatically closing a circuit, through the motor upon the taking up of the load by the engine, whereby the unit counter will accurately show the length of time the machine has been used under production operation.

Another salient object of our invention is the provision of a novel device, which can be readily and quickly incorporated with the internal combustion engine of an electric welding machine or the like, without any change in the construction of the machine.

A further object of our invention is the provision of a closed, tamper-proof casing for the reception of the drive electric motor, the unit counter and the switch for connection with a desired machine, the casing having a sight window for permitting the inspection of the indicating dials of the counter.

A further important object of our invention is the provision of novel means for operating the switch from the governor rod of the drive engine, or by the action of the governor.

A still further object of our invention is the provision of a novel counter attachment for rental machines of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more fully described and claimed, and illustrated in the accompanying drawing, in which drawing, Figure 1, is a side elevational view showing our novel device incorporated with the power plant of an electric welding machine.

Referring to the drawing in detail, wherein similar reference characters designate corresponding parts throughout the several views, the letter "A" generally indicates our novel attachment and "E" an electric welding machine with which our attachment can be associated.

Figure 1:
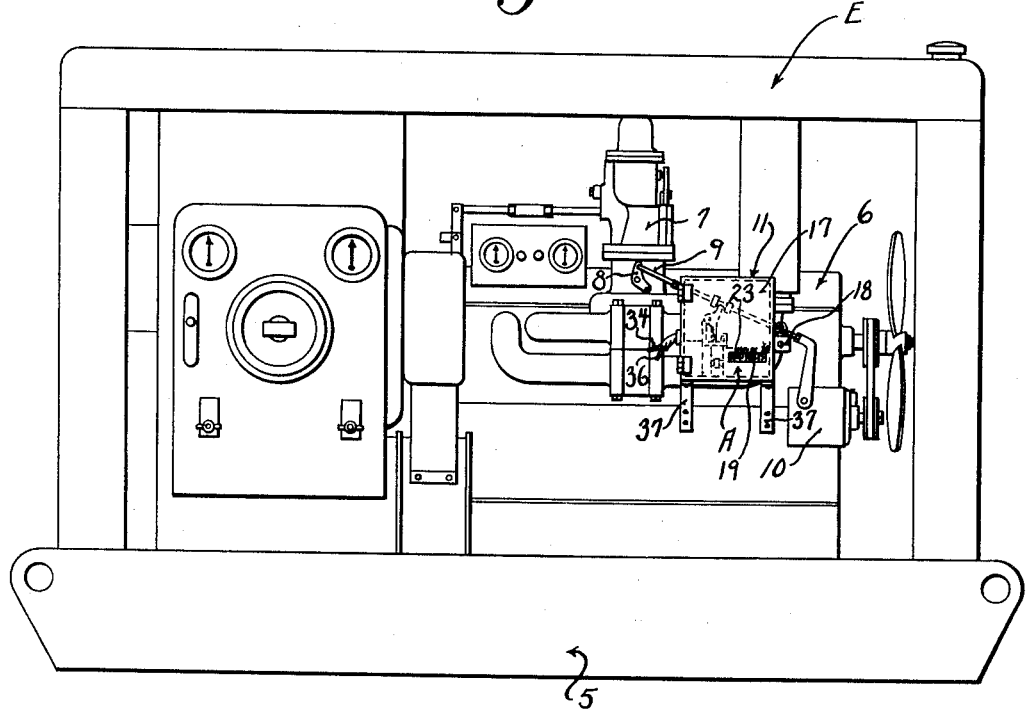

While we have shown our attachment "A" incorporated with an electric welding machine, it is to be understood that our attachment can be associated with any type of rental machine embodying a governor controlled internal combustion engine.

The electric welding machine "E" can be considered of any desired size or make of the arc type and as shown, the machine "E" includes a base 5, having mounted thereon an internal combustion engine 6 for driving the generator for the arc welder. The internal combustion engine includes the down draft carburetor 7, having a throttle valve 8. The throttle valve 8 is automatically regulated through the medium of a rod 9, leading to a governor 10. The governor 10 can be driven from the fan shaft of the engine. The parts described are conventional and are found on most electric arc welding machines now on the market.

Our attachment "A" comprises a casing 11 preferably formed from strong, rugged material. The casing includes a rear wall 12, top and bottom walls 13 and 14, and upright side walls 15 and 16. The front of the casing 11 is closed by a hinged door 17. A suitable lock 18, can be utilized for holding the door 17 against opening movement by unauthorized persons. This door can be provided with a sight window 19 for a purpose, which will later appear. Securely mounted within the casing 11, is a fractional horsepower electric motor 20. This motor 20 is operatively connected to the drive shaft 21 of a unit counter 22. The unit counter 22 is also of the ordinary type now found on the open market, and hence the same will not be described in detail. It is to be understood however, that this unit counter 22 embodies counter wheels 23 bearing numerals 1 to 9 and 0, and that upon the complete revolution of one counter wheel the next adjacent counter wheel will be turned one space. Actually, the counter wheels can bear any type of indices desired. The unit counter 22 is secured in the casing and the counter wheels can be seen through the sight opening 19, when the door 17 is in its closed position. A suitable gear reduction unit can be utilized between the motor 20 and the shaft 21, for the unit counter, so that the unit counter will be driven an exact desired rate per hour.

The side walls 15 and 16 of the casing 11 are provided with openings 24 for the reception of the governor rod 9. Hence the governor rod 9 can freely slide in the casing under influence of the governor 10. In accordance with our invention this governor rod 9 is provided with a pair of spaced, stop collars 25. Either one or both of these collars can be adjusted on the rod 9, as may be desired.

Secured within the casing 11, preferably on the motor 20, is a bracket 26. This bracket 26 carries the circuit maker and breaker 27, for the motor 20. This circuit maker and breaker includes a swinging arm 28 hingedly connected to the upper end of the bracket. The upper end of the arm 28 carries a yoke 29 which straddles the governor rod 9 between the spaced collars 25. The lower end of the arm 28 carries a resilient contact blade 30. The blade in turn carries a contact point 31. An insulated contact point 32 is carried by the bracket and upon movement of the rod 9 in one direction, as will be later set forth, the contact 31 will be moved into electrical engagement with the stationary contact 32. A battery 33 is provided for the electric motor. Leading from one terminal of the battery 33 is an electric conducting wire 34 and this wire is electrically connected to the stationary contact 32. One terminal of the electric motor 20 is electrically connected to the contact blade 30 by a flexible wire 35 and the other terminal of the battery is connected by a wire 36 to the battery terminal opposite to the terminal carrying the wire 34.

Figure 2:
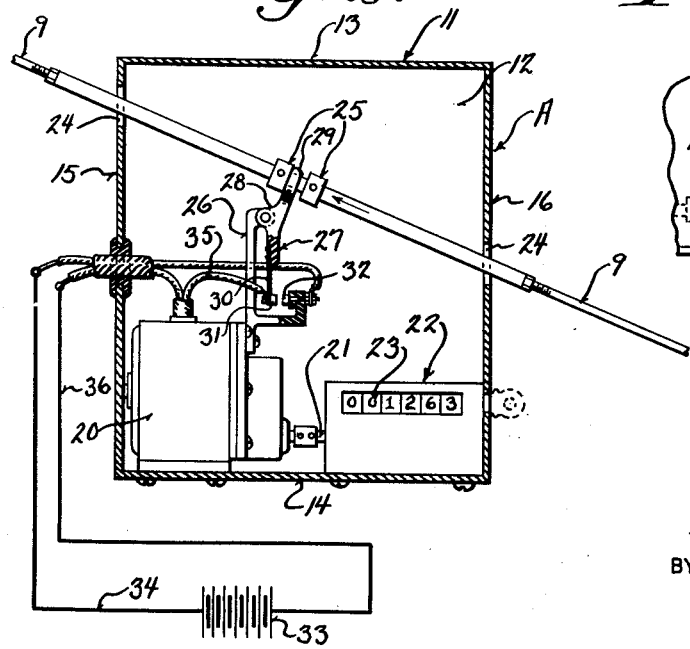
Figure 2, is an enlarged vertical, sectional view through the attachment illustrating the connection between the governor rod of the power plant of the electric welding machine, and the control switch for the counter, the view also showing diagrammatically the wiring for the motor.
Figure 3:
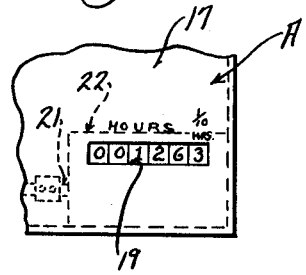
Figure 3, is an enlarged, fragmentary front elevational view of the casing forming a part of our attachment.

In use of our attachment the casing is secured rigidly in place to the machine "E" at the appropriate point by brackets 37 and the governor rod is disconnected from the governor and throttle valve and is passed through the openings 24 and is then reconnected in place to the governor and the throttle valve. The arm 28 is placed so as to embrace the rod 9, and the collars 25 are adjusted. Upon the taking up of the load by the internal combustion engine 6 beyond normal idling speed the governor rod 9 will move to the left (see Figures 1 and 2). The lower stop collar 25 will then move the arm 28 so that the contact 31 will engage the contact 32 and the circuit will be closed through the electric motor 20. As long as the electric motor 20 is in operation the unit counter 22 will be driven and hence the governor will show by its counter wheels the length of time that the machine is in use. As soon as the engine returns to idling speed the uppermost stop collar 25 will move the arm so as to swing the contact point 31 from out of engagement with the contact point 32.

As heretofore brought out, the counter wheels can be marked in any preferred manner. In the present instance, the extreme counter wheel on the right indicates tenths of hours and the next adjacent counter wheel indicates hours, and so on.

A re-set key can be provided for manually moving back the counter wheels to "zero" position.

This device can also be used to register the exact time from starting to stopping of any internal combustion operated machine by disconnecting the governor rod and locking it in closed position, and connecting leads 33 or 34, depending on polarity of ignition switch and attaching proper lead to ignition switch. This is for machines that do not or are not governor controlled.

Changes in details may be made without departing from the spirit or the scope of our invention, but what we claim as new is:

The combination with a machine including an internal combustion engine as a prime mover, said internal combustion engine including a sliding governor rod; of an attachment for indicating the length of time of the actual use of the machine while under production operation including a normally closed casing, means rigidly securing the casing in place adjacent to the internal combustion engine, said casing having openings for slidably receiving the governor rod, an electric motor in said casing, a unit counter in said casing driven from said electric motor, a source of electrical energy for the motor, a switch in said casing for opening and closing the circuit to the motor including a swinging arm, said arm having a yoke straddling the governor rod, and spaced stop collars on the governor rod on opposite sides of the yoke.

WILLIAM H. JENSEN.
MAURICE R. BATES.

REFERENCES CITED

The following references are of record in the file of this patent:

UNITED STATES PATENTS

| Number | Name | Date |
| --- | --- | --- |
| 166,304 | Sandford | Aug. 3, 1875 |
| 1,065,192 | Tyler | June 17, 1913 |
| 1,414,910 | Watson | May 2, 1922 |
| 1,456,313 | Johansen | May 22, 1923 |
| 1,813,777 | Stack | July 7, 1931 |

FOREIGN PATENTS

| Number | Country | Date |
| --- | --- | --- |
| 54,289 | Denmark | Feb. 7, 1938 |
| 372,738 | Germany | Feb. 20, 1920 |